(12) United States Patent
Agrawal et al.

(10) Patent No.: US 11,336,162 B2
(45) Date of Patent: May 17, 2022

(54) SPHERICAL BRUSHLESS DIRECT CURRENT MACHINE

(71) Applicant: HONEYWELL INTERNATIONAL INC., Morris Plains, NJ (US)

(72) Inventors: Saurabh Agrawal, Bangalore (IN); Deena Dayalan Kothandaraman, Bangalore (IN); Renju Chandrasekhara Panicker, Bangalore (IN); Ramakrishna Rao Pavanje Vishwanatha, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 220 days.

(21) Appl. No.: 16/721,110

(22) Filed: Dec. 19, 2019

(65) Prior Publication Data

US 2020/0227989 A1 Jul. 16, 2020

(30) Foreign Application Priority Data

Jan. 10, 2019 (IN) ............................. 201941001270

(51) Int. Cl.
  *H02K 16/04* (2006.01)
  *H02K 3/28* (2006.01)
  *H02P 27/08* (2006.01)
  *H02K 1/27* (2022.01)
  *H02K 1/14* (2006.01)

(52) U.S. Cl.
  CPC .............. *H02K 16/04* (2013.01); *H02K 1/14* (2013.01); *H02K 1/27* (2013.01); *H02K 3/28* (2013.01); *H02P 27/08* (2013.01); *H02K 2201/18* (2013.01)

(58) Field of Classification Search
  CPC ............ H02K 16/04; H02K 3/28; H02K 1/27; H02K 1/14; H02K 2201/18; H02K 21/22; H02K 21/14; H02P 27/08; H02P 25/22
  USPC ........................................ 310/156.38, 156.01
  See application file for complete search history.

(56) References Cited

U.S. PATENT DOCUMENTS

| 4,739,241 A | 4/1988 | Vachtsevanos et al. |
| 5,410,232 A | 4/1995 | Lee |
| 6,326,714 B1 | 12/2001 | Bandera |

(Continued)

FOREIGN PATENT DOCUMENTS

| EP | 3116111 A1 | 1/2017 |
| JP | 2004015965 A | 1/2004 |

*Primary Examiner* — John K Kim
(74) *Attorney, Agent, or Firm* — Lorenz & Kopf, LLP

(57) ABSTRACT

A spherical brushless direct current (BLDC) machine includes a first stator, a second stator, and a spherical rotor. The first stator is symmetrically disposed about a first axis and includes a first multi-pole stator core having a first multi-phase winding wound thereon. The second stator is symmetrically disposed about a second axis and includes a second multi-pole stator core having a second multi-phase winding wound thereon. The second stator core is coupled to the first stator core, and the second axis intersects the first axis. The spherical rotor is disposed adjacent to, and is moveable relative to, the first and second stators. The spherical rotor includes a plurality of magnets that emanate a magnetic field, and each magnet has at least one of its magnetic poles facing the first and second stators.

8 Claims, 6 Drawing Sheets

(56) References Cited

U.S. PATENT DOCUMENTS

| | | | | |
|---|---|---|---|---|
| 7,728,463 B2* | 6/2010 | Cope | ...................... | H02K 41/03 |
| | | | | 310/12.14 |
| 10,044,296 B2* | 8/2018 | Vandenbaviere | ...... | H02N 2/108 |
| 2004/0124717 A1* | 7/2004 | Corcoran | ............... | G05G 9/047 |
| | | | | 310/12.14 |
| 2009/0230787 A1* | 9/2009 | Won | ....................... | H02K 41/03 |
| | | | | 310/38 |
| 2011/0273052 A1* | 11/2011 | Long | ..................... | H02K 16/02 |
| | | | | 310/208 |
| 2013/0113307 A1 | 5/2013 | Kim et al. | | |
| 2016/0294259 A1* | 10/2016 | Williamson | ............ | H02K 11/33 |
| 2020/0227989 A1* | 7/2020 | Agrawal | ................. | H02K 16/04 |
| 2021/0242728 A1* | 8/2021 | Rajagopal | ................. | H02K 3/28 |

* cited by examiner

SPHERICAL BRUSHLESS DIRECT CURRENT MACHINE

CROSS-REFERENCE TO RELATED APPLICATION

The present application claims benefit of prior filed Indian Provisional Patent Application No. 201941001270, filed Jan. 10, 2019, which is hereby incorporated by reference herein in its entirety.

TECHNICAL FIELD

The present invention generally relates to electromagnetic machines, and more particularly relates to a spherical brushless direct current (BLDC) machine.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

While electronics and sensor technologies have gotten significantly smaller in recent years, mechanical motion technology has not kept up. This is why motion systems such as pan/tilt mechanisms are typically not used on smaller platforms, such as mini- or micro-UAVs (unmanned air vehicles) and micro-satellites. Robotics systems, which depend on multi-DoF motion control, must simply put up with the inherent inefficiencies of current motion-on-motion systems.

Various types of multi-axis machines have been developed to address the above-described problems. In many instances, however, these multi-axis machines are relatively complex to manufacture.

Hence, there is a need for a multi-degree of freedom electromechanical machine that is relatively smaller, less cumbersome, and more efficient than known devices and/or does not rely on relatively complex manufacturing techniques. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a spherical brushless direct current (BLDC) machine includes a first stator, a second stator, and a spherical rotor. The first stator is symmetrically disposed about a first axis and includes a first multi-pole stator core having a first multi-phase winding wound thereon. The second stator is symmetrically disposed about a second axis and includes a second multi-pole stator core having a second multi-phase winding wound thereon. The second stator core is coupled to the first stator core, and the second axis intersects the first axis. The spherical rotor is disposed adjacent to, and is moveable relative to, the first and second stators. The spherical rotor includes a plurality of magnets that emanate a magnetic field, and each magnet has at least one of its magnetic poles facing the first and second stators.

In another embodiment, a spherical brushless direct current (BLDC) machine includes a first stator, a second stator, a third stator, and a spherical rotor. The first stator is symmetrically disposed about a first axis and includes a first multi-pole stator core having a first multi-phase winding wound thereon. The second stator is symmetrically disposed about a second axis and includes a second multi-pole stator core having a second multi-phase winding wound thereon. The second stator core is coupled to the first stator core, and the second axis intersects the first axis. The third stator is symmetrically disposed about a third axis and includes a third multi-pole stator core having a third multi-phase winding wound thereon. The third stator core is coupled to the first and second stator cores, and the third axis intersects the first and second axes. The spherical rotor is disposed adjacent to, and is moveable relative to, the first, second, and third stators. The spherical rotor includes a plurality of magnets that emanate a magnetic field, and each magnet has at least one of its magnetic poles facing the first, second, and third stators.

In yet another embodiment, a spherical brushless direct current (BLDC) machine includes a first stator, a second stator, a third stator, a spherical rotor, and a control. The first stator is symmetrically disposed about a first axis and includes a first multi-pole stator core having a multi-phase spin winding wound thereon. The second stator is symmetrically disposed about a second axis and includes a second multi-pole stator core having a multi-phase roll winding wound thereon. The second stator core is coupled to the first stator core, and the second axis intersects the first axis. The third stator is symmetrically disposed about a third axis and includes a third multi-pole stator core having a multi-phase roll winding wound thereon. The third stator core is coupled to the first and second stator cores, and the third axis intersects the first and second axes. The spherical rotor is disposed adjacent to, and is moveable relative to, the first, second, and third stators. The spherical rotor includes a plurality of magnets that emanate a magnetic field, and each magnet has at least one of its magnetic poles facing the first, second, and third stators. The control is coupled to the multi-phase spin winding, the multi-phase roll winding, and the multi-phase pitch winding. The control is configured to control current magnitudes and directions in each phase of the multi-phase spin winding, in each phase of the multi-phase roll winding, and in each phase of the multi-phase pitch winding, to thereby control movement of the spherical rotor. The multi-phase spin winding, the multi-phase roll winding, and the multi-phase pitch winding are each configured as a 3-phase winding wound in a wye configuration.

Furthermore, other desirable features and characteristics of the spherical BLDC machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
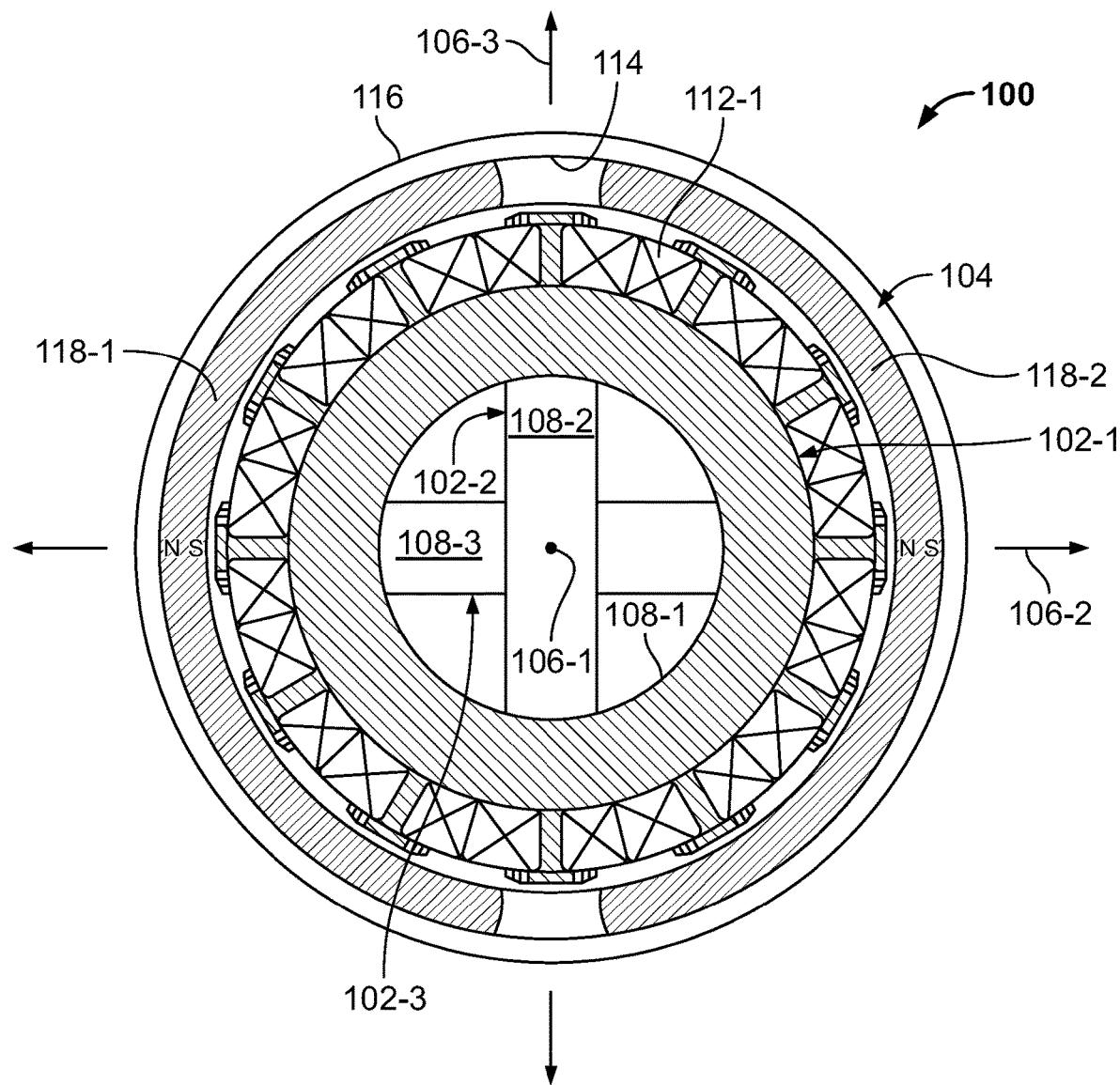
FIG. 1 depicts a simplified cross section view of one embodiment of a three degree-of-freedom BLDC machine.

With reference first to FIG. 1, a simplified cross section view of one embodiment of a three degree-of-freedom brushless direct current (BLDC) machine 100 is depicted. The depicted machine 100 includes at least a plurality of stators 102—a first stator 102-1, a second stator 102-2, and a third stator 102-3—and a spherical rotor 104.

The first stator 102 is symmetrically disposed about a first axis 106-1 and includes a first multi-pole stator core 108-1 on which a first multi-phase winding 112-1 is wound. The second stator 102-2 is symmetrically disposed about a second axis 106-2 and includes a second multi-pole stator core 108-2. The second multi-pole stator core 102-2 is coupled to the first stator core 108-1 and has a second multi-phase winding 112-2 (not visible in FIG. 1) wound thereon. The third stator 102-3 is symmetrically disposed about a third axis 106-3 and includes a third multi-pole stator core 108-3. The third multi-pole stator core 102-3 is coupled to the first and second stator cores 108-1, 108-2 and has a third multi-phase winding 112-3 (not visible in FIG. 1) wound thereon. As used herein, and as is clear from the drawings, the term "multi-pole stator" is synonymous with "multi-post stator," and the term "pole" when used in the context of a stator, is synonymous with "post."

Figure 2:
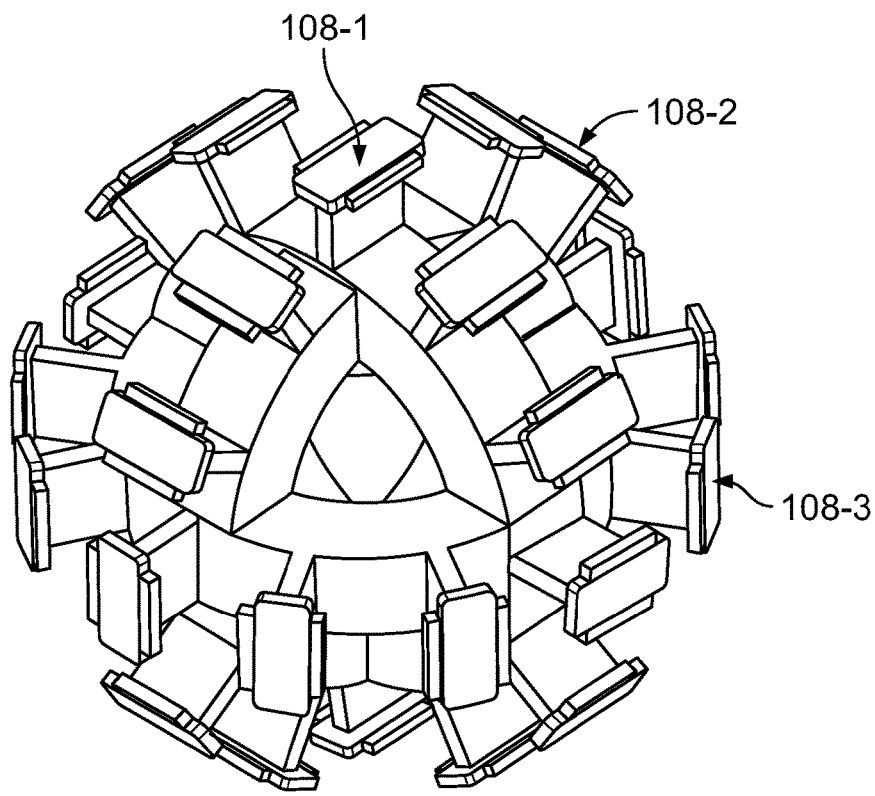
FIG. 2 depicts an isometric view of one embodiment a three degree-of-freedom BLDC stator structure that may be used to implement the BLDC machine of FIG. 1.
Figure 3:
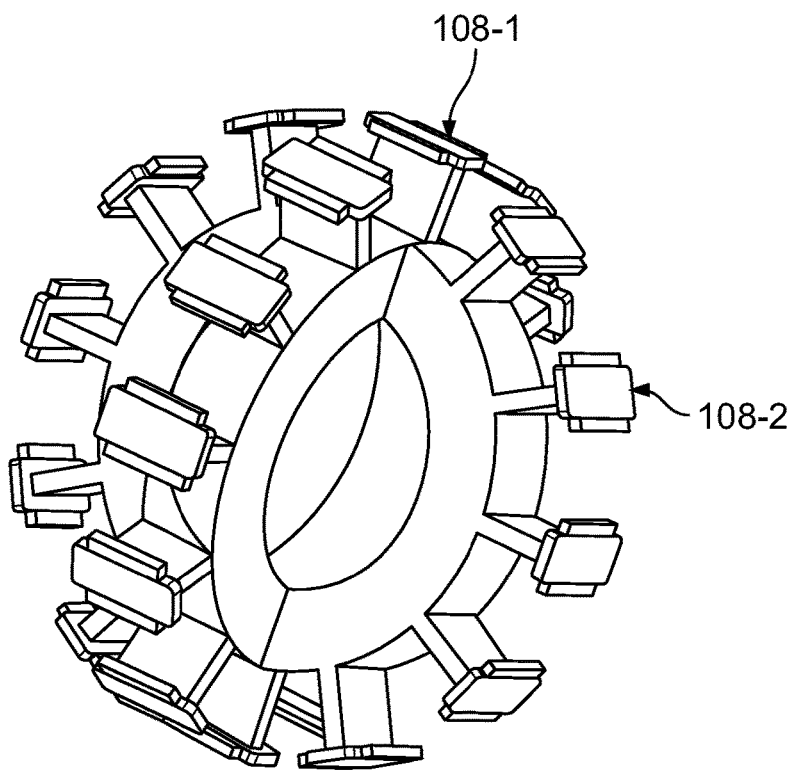
FIG. 3 depicts an isometric view of one embodiment a two degree-of-freedom BLDC stator.

Before proceeding further, for added clarity one particular physical arrangement of the multipole stator cores 108 is depicted in FIG. 2. It will be appreciated that although the embodiments depicted in FIGS. 1 and 2 and further described herein include three stator cores 108, in other embodiments the machine 100 could be implemented with only two stator cores. For completeness, one particular physical arrangement of an embodiment that includes only two multipole stator cores 108 is depicted in FIG. 3.

Returning now to FIG. 1, it is seen that in the depicted embodiment the first, second, and third axes 106-1, 106-2, 106-3 are disposed perpendicular to each other. It will be appreciated, however, that in other embodiments, the axes 106 need not be perpendicularly disposed, and could intersect at non-perpendicular angles. As FIG. 1 further depicts, for the depicted machine 100, the number of stator poles on each multi-pole stator core 108 is twelve. It will be appreciated, however, that this is merely exemplary. In other embodiments, the stator cores 108 could be implemented with more or less than this number of stator poles. Moreover, it will be appreciated that the first, second, and third multi-phase windings 112 may be wound on the first, second, and third multi-pole stator cores 108, respectively, using any one of numerous multi-phase winding configurations now known or developed in the future. Two known configurations that may be implemented include a 3-phase delta winding configuration or a 3-phase wye winding configuration.

The spherical rotor 104 is spaced apart from, and is disposed adjacent to, the stators 102. The spherical rotor 104, which includes an inner surface 114 and an outer surface 116, is mounted such that it is movable relative to the stators 102. Preferably, the spherical rotor 104 is mounted such that it is movable, relative to the stators 102, about each of the axes 106. How this movement is accomplished will be described further below. Like the spherical stator 102, the armature 104 also preferably comprises a magnetically permeable material such as, for example, iron or an iron alloy.

Figure 4:
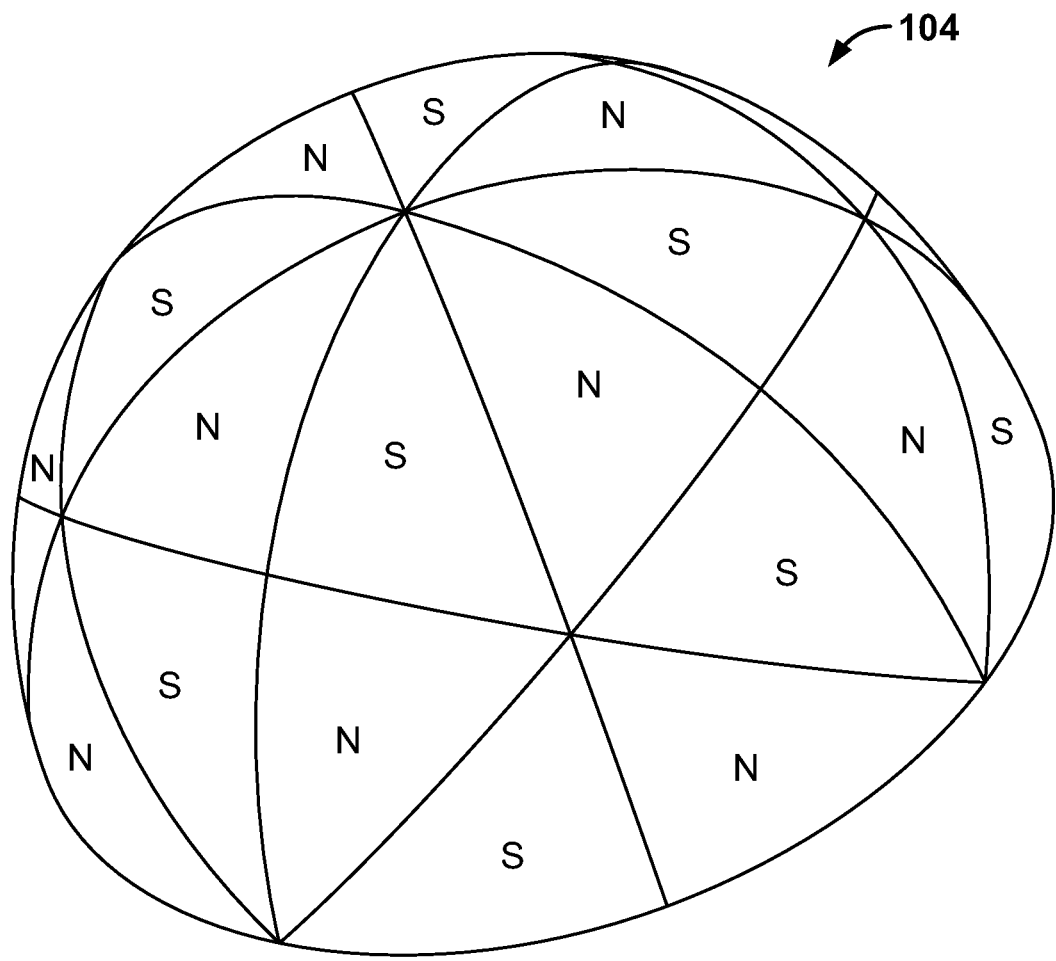
FIG. 4 depicts an alternate arrangement of magnets on the spherical rotor of FIG. 1.

A plurality of magnets 118 are coupled to, and extend inwardly from, the inner surface 114 of the spherical rotor 104. The magnets 118 are spaced apart from the stators 102 and each emanates a magnetic field. In the depicted embodiment, the BLDC machine 100 includes a pair of magnets—a first magnet 118-1 and a second magnet 118-2. It will be appreciated, however, that in other embodiments the BLDC machine 100 may be implemented with more or less than two magnets 118. It will additionally be appreciated that the magnets 118 may be variously shaped and dimensioned, and that the magnets 118 may be variously disposed. For example, in the depicted embodiment the magnets 118 are generally arc-shaped, but in other embodiments, the magnets 118 may be implemented with any one of numerous other shapes if needed or desired. One alternative implementation is depicted in FIG. 4. It will additionally be appreciated that the magnets 118 may be permanent magnets or, if needed or desired, electromagnets.

Regardless of the shape and dimensions, however, the magnets 118 are preferably arranged such that the polarities of diametrically opposed magnets 118 are opposite. For example, in the embodiment depicted in FIG. 1, the north pole (N) of the first magnet 118-1 is disposed closer to the stator 102, whereas the south pole (S) of the diametrically opposed second magnet 118-2 is disposed closer to the stator 102. With this configuration, when one or more of the 3-phase stator windings 112 is energized, a Lorentz force is generated between the energized stator windings 112 and the magnets 108, which in turn generates in a torque about one or more of the axes 106. The direction of the generated torque, as may also by appreciated, is based on the direction of the current flow in the stator windings 112.

Before proceeding further, it is noted that in the embodiment depicted in FIG. 1, each pole of the first, second, and third multi-pole stator cores 108-1, 108-2, 108-3 extends radially outwardly, and the spherical rotor 104 surrounds (or at least partially surrounds) the stators 102. In other embodiments, such as the one depicted in FIG. 6, each pole of the first, second, and third multi-pole stator cores 108-1, 108-2, 108-3 extends radially inwardly, and the rotor 104 is surrounded by (or at least partially surrounded by) the stators 102.

Figure 6:
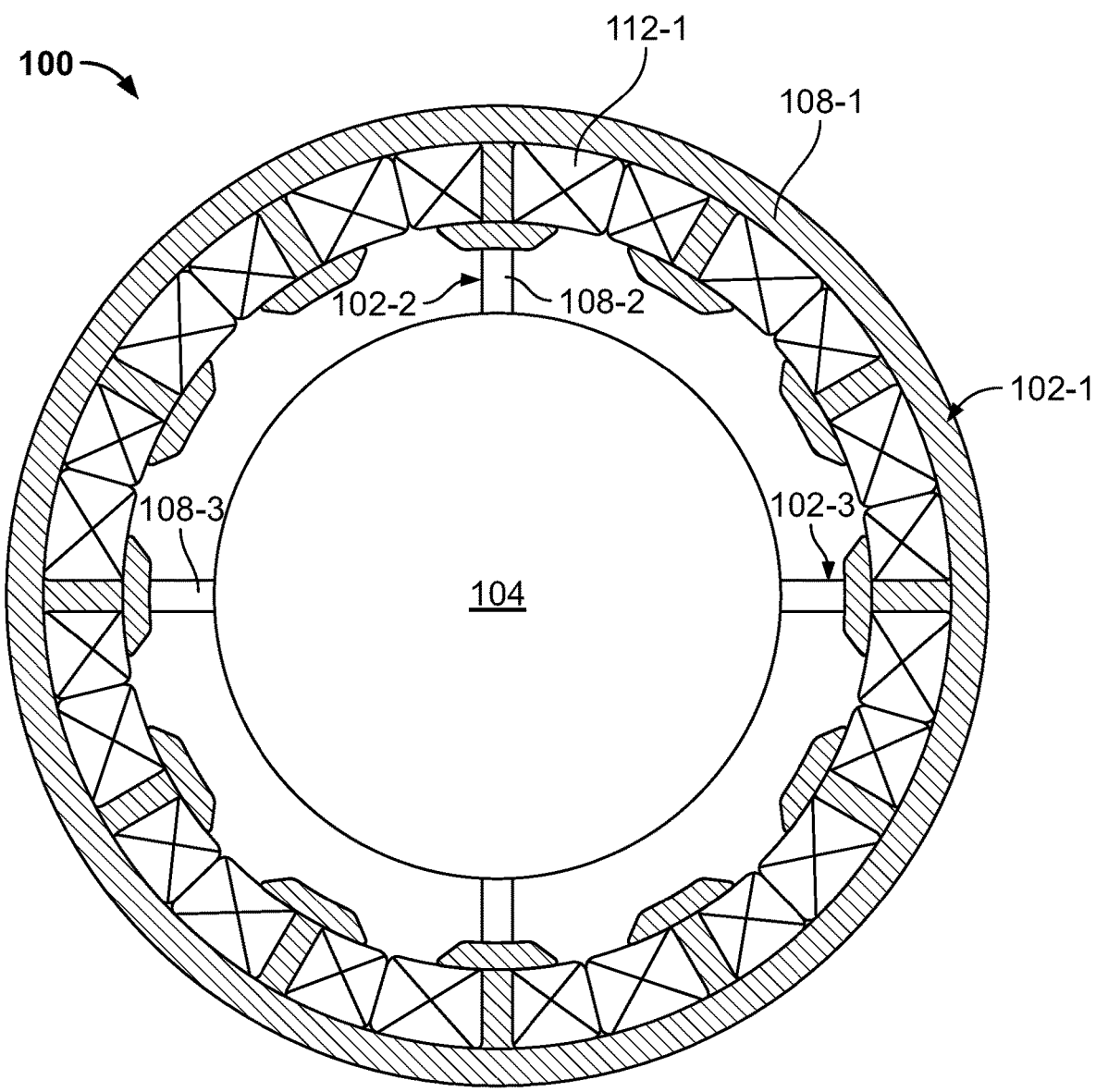
FIG. 6 depicts a simplified cross section view of one embodiment of a three degree-of-freedom BLDC machine.
Figure 7:
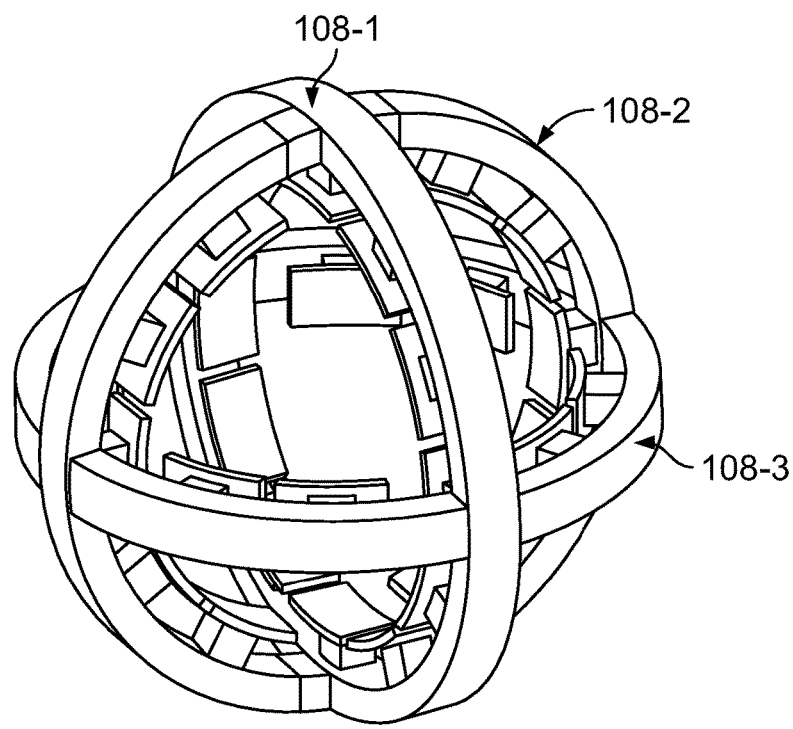
FIG. 7 depicts an isometric view of one embodiment a three degree-of-freedom BLDC stator structure that may be used to implement the BLDC machine of FIG. 6.
Figure 8:
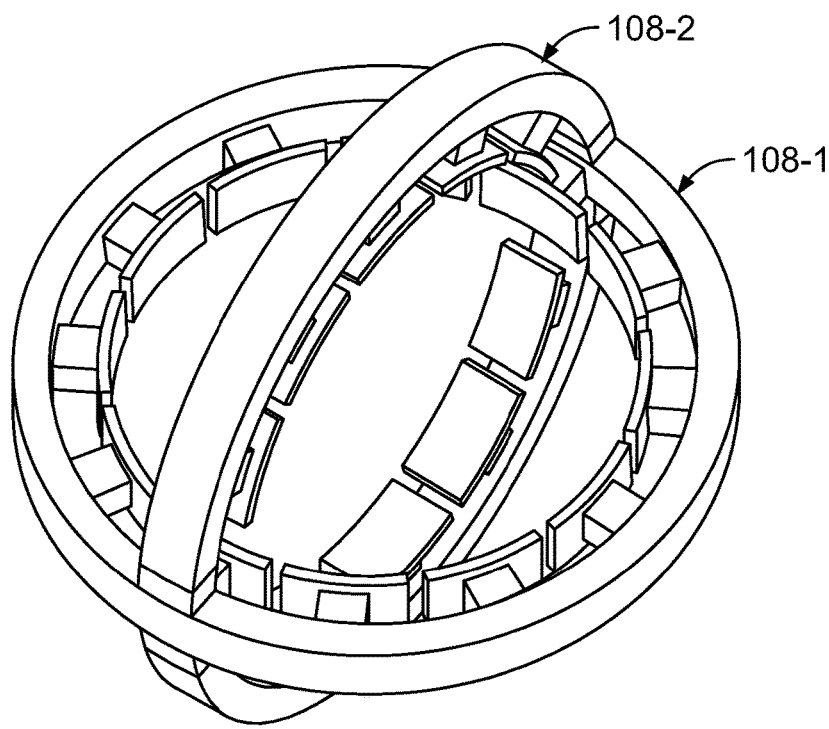
FIG. 8 depicts an isometric view of another embodiment a two degree-of-freedom BLDC stator.

For added clarity, one particular physical arrangement of the multipole stator cores 108 of the embodiment depicted in FIG. 6 is depicted in FIG. 7. It will be appreciated that although the embodiments depicted in FIGS. 6 and 7 and described herein include three stator cores 108, in other embodiments the machine 100 could be implemented with only two stator cores. For completeness, one particular physical arrangement of an embodiment that includes only two multipole stator cores 108 is depicted in FIG. 8.

Figure 5:
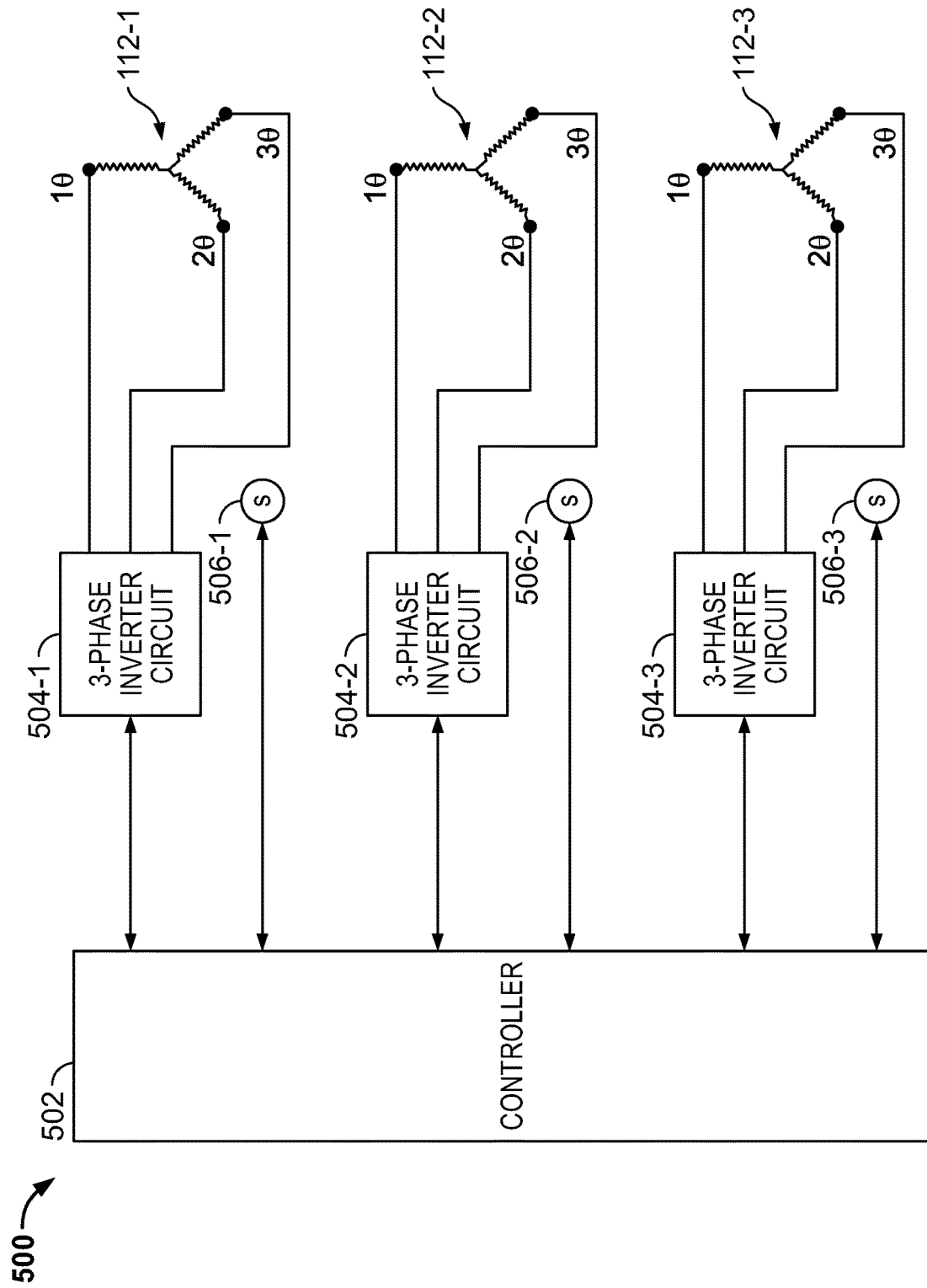
FIG. 5 depicts a schematic representation of one embodiment of an electronic control circuit for the stator windings of one of the stators depicted in FIGS. 1-3 and 6.

Turning now to FIG. 5, a functional block diagram of control system 500 that includes the spherical BLDC machine 100 of FIG. 1 is depicted. As FIG. 5 depicts, the system 500 includes a controller 502 that is coupled to three different multi-phase inverter circuits 504—a first multi-phase inverter circuit 504-1, a second multi-phase inverter circuit 504-2, and a third multi-phase inverter circuit 504-3. Each of the multi-phase inverter circuits 504, which may be implemented using any one of numerous known circuit topologies, is in turn coupled to a different one of the first, second, and third multi-phase stator windings 112-1, 112-2, 112-3. In the depicted embodiment, as FIG. 5 also illustrates, each of the multi-phase stator windings is configured as a 3-phase winding wound in the conventional wye configuration. As such, each multi-phase inverter circuit 504 is configured as a 3-phase inverter circuit.

The control 502 is configured as a pulse-width modulation (PWM) controller that, using any one of numerous known PWM commutation techniques, independently controls each of the 3-phase inverter circuits 504-1, 504-2, 504-3 to thereby control the current magnitudes and directions in each of the 3-phases (1φ, 2φ, 3φ) of the 3-phase stator winding 112. This in turn controls the movement of the rotor 104. The control 502 may be configured to implement any one of numerous sensorless commutation schemes, sensor commutation schemes, or combinations thereof. When a sensor commutation scheme is used, one or more position sensors 506, such as Hall sensors, digital magnetic position sensors, winding current sensors, back electromotive force (EMF) sensors, or inductance/resistance sensors, may be included.

It will be appreciated that data and power may be transmitted to and from the 3-phase stator windings 112 and position sensor(s) 506 (if included), using any one of numerous techniques. For example, data may be transmitted wirelessly, via flexible conductors, or via miniature slip rings, and power may be transmitted via flexible conductors, via miniature slip rings, or provided via a battery. It will additionally be appreciated that if the machine 100 is implemented with only two stator cores, then only two multi-phase inverter circuits 504 may be included.

A brief explanation of how the spherical BLDC machine 100 may be controlled will now be provided. In doing so, it is noted that in the following explanation the first multi-phase winding 112-1 is referred to as the spin winding, the second multi-phase winding 112-2 is referred to as the roll winding, and the third multi-phase winding 112-3 is referred to as the pitch winding. With this background in mind, to cause the rotor 104 to spin, the control 502 controls the first multi-phase inverter circuit 504-1 to energize the spin winding 112-1, and also controls the second and third 3-phase inverter circuits 504-2, 504-3 to keep the roll and pitch windings 112-2, 112-3 deenergized.

To move the rotor 104 in a roll and/or pitch direction, the control 502 controls the second and/or third 3-phase inverter circuits 504-2, 504-3 to energize the roll and pitch windings 112-2, 112-3. It should be noted that the commutation frequency for roll and pitch are based on the speed of rotation in the spin axis. The spin speed can be measured either by measuring the back EMF on the spin winding 112-1 or by using the Hall effect sensors 1106.

The spherical BLDC machine 100 disclosed herein may be used in various technological devices and environments. For example, it can be used to provide pitch and roll control for unmanned aerial vehicles (UAVs), and to provide gimbal stabilization for aerial photography, aerial inspection and surveillance, search light stabilization, etc. Numerous other technologies and environments may also benefit from the spherical BLDS machine 100.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A spherical brushless direct current (BLDC) machine, comprising:
   a first stator symmetrically disposed about a first axis, the first stator comprising a first multi-post stator core having a first multi-phase winding wound thereon;
   a second stator symmetrically disposed about a second axis, the second stator comprising a second multi-post stator core having a second multi-phase winding wound thereon, the second stator core coupled to the first stator core, the second axis intersecting the first axis;
   a third stator symmetrically disposed about a third axis, the third stator comprising a third multi-post stator core having a third multi-phase winding wound thereon, the third stator core coupled to the first and second stator cores, the third axis intersecting the first and second axes; and
   a spherical rotor disposed adjacent to, and moveable relative to, the first, second, and third stators, the spherical rotor including a plurality of magnets that emanate a magnetic field, each magnet having at least one of its magnetic poles facing the first, second, and third stators.

2. The BLDC machine of claim 1, wherein:
   each post of the first, second, and third multi-post stator cores extend radially outwardly; and
   the spherical rotor at least partially surrounds the first, second, and third stators.

3. The BLDC machine of claim 1, wherein:
   each post of the first, second, and third multi-post stator cores extend radially inwardly; and
   the spherical rotor is at least partially surrounded by the first, second, and third stators.

4. The BLDC machine of claim 1, wherein:
   the first, second, and third multi-phase stator windings are each configured as a 3-phase winding wound in a wye configuration.

5. The BLDC machine of claim 4, further comprising:
   a control coupled to the first, second, and third multi-phase stator windings, the control configured to control current magnitudes and directions in each phase of the first multi-phase stator winding, in each phase of the second multi-phase stator winding, and in each phase of the third multi-phase stator winding, to thereby control movement of the spherical rotor.

6. The BLDC machine of claim 5, further comprising:
   a first multi-phase inverter circuit coupled between the control and the first multi-phase stator winding;
   a second multi-phase inverter circuit coupled between the control and the second multi-phase stator winding; and
   a third multi-phase inverter circuit coupled between the control and the third multi-phase stator winding,
   wherein the control is configured as a pulse-width modulation (PWM) controller that independently controls each of the multi-phase inverter circuits.

7. A spherical brushless direct current (BLDC) machine, comprising:
   a first stator symmetrically disposed about a first axis, the first stator comprising a first multi-post stator core having a multi-phase spin winding wound thereon, each post of the first multi-post stator extending radially outwardly;
   a second stator symmetrically disposed about a second axis, the second stator comprising a second multi-post stator core having a multi-phase roll winding wound thereon, the second stator core coupled to the first stator core, the second axis intersecting the first axis, each post of the second multi-post stator extending radially outwardly;
   a third stator symmetrically disposed about a third axis, the third stator comprising a third multi-post stator core having a multi-phase pitch winding wound thereon, the third stator core coupled to the first and second stator cores, the third axis intersecting the first and second axes, each post of the third multi-post stator extending radially outwardly;
   a spherical rotor disposed at least partially surrounding, and moveable relative to, the first, second, and third stators, the spherical rotor including a plurality of magnets that emanate a magnetic field, each magnet having at least one of its magnetic poles facing the first, second, and third stators; and
   a control coupled to the multi-phase spin winding, the multi-phase roll winding, and the multi-phase pitch winding, the control configured to control current magnitudes and directions in each phase of the multi-phase spin winding, in each phase of the multi-phase roll winding, and in each phase of the multi-phase pitch winding, to thereby control movement of the spherical rotor,
   wherein the multi-phase spin winding, the multi-phase roll winding, and the multi-phase pitch winding are each configured as a 3-phase winding wound in a wye configuration.

8. The BLDC machine of claim 7, further comprising:
   a first multi-phase inverter circuit coupled between the control and the multi-phase spin winding;
   a second multi-phase inverter circuit coupled between the control and the multi-phase roll winding; and
   a third multi-phase inverter circuit coupled between the control and the multi-phase pitch winding,
   wherein the control is configured as a pulse-width modulation (PWM) controller that independently controls each of the multi-phase inverter circuits.

* * * * *